United States Patent
Guntoro et al.

(10) Patent No.: US 11,537,090 B2
(45) Date of Patent: Dec. 27, 2022

(54) MODEL CALCULATING UNIT AND CONTROL UNIT FOR SELECTIVELY CALCULATING AN RBF MODEL, A GAUSSIAN PROCESS MODEL AND AN MLP MODEL

(71) Applicant: Robert Bosch GmbH, Stuttgart (DE)

(72) Inventors: Andre Guntoro, Weil der Stadt (DE); Ernst Kloppenburg, Ditzingen (DE); Heiner Markert, Stuttgart (DE); Martin Schiegg, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 965 days.

(21) Appl. No.: 16/466,731

(22) PCT Filed: Sep. 4, 2017

(86) PCT No.: PCT/EP2017/072051
§ 371 (c)(1),
(2) Date: Jun. 5, 2019

(87) PCT Pub. No.: WO2018/046422
PCT Pub. Date: Mar. 15, 2018

(65) Prior Publication Data
US 2019/0310590 A1 Oct. 10, 2019

(30) Foreign Application Priority Data
Sep. 7, 2016 (DE) ............... 10 2016 216 951.3

(51) Int. Cl.
*G06N 3/063* (2006.01)
*G05B 13/02* (2006.01)
(Continued)

(52) U.S. Cl.
CPC ........... *G05B 13/027* (2013.01); *G06N 3/063* (2013.01); *F02P 5/15* (2013.01); *G06N 7/005* (2013.01)

(58) Field of Classification Search
CPC ...... G05B 13/027; G06N 3/063; G06N 7/005; F02P 5/15
See application file for complete search history.

(56) References Cited

U.S. PATENT DOCUMENTS

| | | | | |
|---|---|---|---|---|
| 5,539,638 A | * | 7/1996 | Keeler | ............... F02D 41/1401 701/33.9 |
| 7,577,626 B1 | * | 8/2009 | Mountrakis | .............. G06N 3/04 706/26 |

(Continued)

OTHER PUBLICATIONS

Richard Fiifi Turkson et al "Artificial neural network applications in the calibration of spark-ignition engines: An Overview", Engineering Science And Technology, An International Journal, Bd. 19, Nr. 3, Apr. 16, 2016, pp. 1346-1357.

(Continued)

*Primary Examiner* — Gary Collins
(74) *Attorney, Agent, or Firm* — Norton Rose Fulbright US LLP; Gerard Messina

(57) ABSTRACT

A model calculating unit for the selective calculation of an RBF model or of a neural layer of a multilayer perceptron model having a hardwired processor core designed in hardware for calculating a fixedly specified computing algorithm in coupled function blocks. The processor core is designed to calculate an output variable for an RBF model as a function of one or multiple input variables of an input variable vector, of supporting points, of length scales, of parameters specified for each supporting point, the processor core furthermore being designed to calculate an output variable for each neuron for the neural layer of the multilayer perceptron model having a number of neurons as a (Continued)

function of the one or the multiple input variables of the input variable vector, of a weighting matrix having weighting factors and an offset value specified for each neuron.

12 Claims, 4 Drawing Sheets

(51) Int. Cl.
F02P 5/15 (2006.01)
G06N 7/00 (2006.01)

(56) References Cited

U.S. PATENT DOCUMENTS

| | | | | |
|---|---|---|---|---|
| 2003/0216853 | A1* | 11/2003 | Jacobson | F02D 35/023 701/111 |
| 2006/0212209 | A1* | 9/2006 | Cesario | F02D 41/1458 73/35.12 |
| 2007/0203616 | A1* | 8/2007 | Borrmann | G06N 3/0481 701/1 |
| 2008/0262677 | A1* | 10/2008 | Komori | B60W 40/103 701/41 |
| 2009/0007888 | A1* | 1/2009 | Sarlashkar | F02D 35/026 123/478 |
| 2010/0024536 | A1* | 2/2010 | Adibhatla | G05B 23/0221 73/112.01 |
| 2010/0050025 | A1* | 2/2010 | Grichnik | G05B 17/02 714/E11.2 |
| 2010/0299080 | A1* | 11/2010 | Willmann | F01M 11/10 73/53.05 |
| 2013/0158840 | A1* | 6/2013 | Lu | G06N 20/00 703/2 |
| 2015/0046108 | A1* | 2/2015 | Akamine | H01M 10/482 702/63 |
| 2015/0262434 | A1* | 9/2015 | Schnorbus | G07C 5/08 702/123 |
| 2016/0358070 | A1* | 12/2016 | Brothers | G06N 3/0454 |
| 2017/0178027 | A1* | 6/2017 | Duggan | G06F 9/543 |

OTHER PUBLICATIONS

Yilmaz Ahmet Serdar et al: "Pitch angle control in wind turbines above the rated wind speed by milty-layer perceptron and radial basis function neural networks", Expert Systems with Applications, Bd. 36, Nr. 6, Aug. 1, 2009, pp. 9767-9775.

International Search Report for PCT/EP2017/072051, dated Nov. 16, 2017.

"Introduction To Interpolated Neural Networks", APR Power White Paper, 2009, pp. 1-57, XP055420876.

Eppler W et al., "High Speed Neural Network Chip for Trigger Purposes in High Energy Physics" Design, Automation and Test in Europe, 1998, pp. 108-115.

* cited by examiner

MODEL CALCULATING UNIT AND CONTROL UNIT FOR SELECTIVELY CALCULATING AN RBF MODEL, A GAUSSIAN PROCESS MODEL AND AN MLP MODEL

FIELD

The present invention relates to the calculation of functional models in a separate hardwired model calculating unit, in particular for calculating multilayer perceptron models (MLP: multilayer perceptron) as well as RBF models (RBF: Radial Basis Function).

BACKGROUND INFORMATION

Functions in control units of motor vehicles are frequently implemented using models that represent a mathematical representation of the real system. In physical models, however, especially in complex contexts, there is a lack of required precision in the calculation, and it is normally difficult, given today's computing capacities, to calculate such models within the real-time requirements demanded for a control unit. For such cases, a use of data-based models is contemplated that describe relationships between an output variable and input variables exclusively on the basis of training data obtained with the aid of a test stand or the like. Particularly suitable are data-based models for modeling complex relationships, in which multiple input variables, between which there exist reciprocal relationships, are taken into account in the model in a suitable manner. Modeling with the aid of data-based models additionally offers the possibility of complementing the model by adding individual input variables.

Data-based functional models are normally based on a great number of supporting points in order to achieve a modeling precision that is sufficient for the respective application. Due to the great number of supporting points, a high computing capacity is required for calculating a model value using a data-based functional model such as for example a Gaussian process model or a multilayer perceptron model. In order to be able to calculate such a data-based functional model in a control unit application in real time, model calculating units based on a hardware design may therefore be provided.

SUMMARY

The present invention provides a model calculating unit for calculating an RBF model as well as a control unit and a use of the control unit.

Additional developments of the present invention are described herein.

According to a first aspect of the present invention, a model calculating unit is provided for selectively calculating an RBF model or a neural layer of a multilayer perceptron model having a hardwired processor core designed in hardware for calculating a definitely specified computing algorithm in coupled functional blocks. The processor core is designed to calculate an output variable for an RBF model as a function of one or multiple input variables of an input variable vector, of supporting points, of length scales, of parameters specified for each supporting point, the output variable being formed as a sum of value calculated for each supporting point, the value being in particular a product of a parameter associated with the respective supporting point and a result of an exponential function of a value that results from the quadratic distance of the respective supporting point from the input variable vector that is weighted by the length scales. The processor core is furthermore designed to calculate an output variable for each neuron for the neural layer of the multilayer perceptron model having a number of neurons as a function of the one or the multiple input variables of the input variable vector, of a weighting matrix having weighting factors and an offset value specified for each neuron, a sum of the values of the input variables, weighted by a weighting factor determined by the neuron and the input variable, and the offset value specified for the neuron being calculated in particular for each neuron of the neural layer, and the result being transformed using an activation function in order to obtain the output variable for the neuron.

In accordance with the present invention, the above model calculating unit is to made configurable so as to make it possible to calculate selectively an RBF model or a neural layer of a multilayer perceptron model (MLP model) having a variable number of neurons.

In accordance with the present invention, there may be a provision for assigning a shared memory area to the supporting points and the weighting matrix including weighting factors.

Furthermore, in accordance with the present invention, a shared memory area may be assigned to the parameters specified for each supporting point and to the offset values specified for each neuron.

The processor core may be designed to perform the selection of the calculation of the RBF model or of the neural layer of the multilayer perceptron model with the aid of a selection variable.

Furthermore, the processor core may comprise a state machine, a memory for storing the one or multiple input variables of the input variable vector, of the supporting points, of the length scales, of the parameters specified for each supporting point and of the output variable, one or multiple calculation operation blocks, in particular a MAC block and an exponential function calculation block.

The processor core may be designed in particular to select, as a function of a further selection variable, a type of activation function for the multilayer perceptron model and/or to perform the calculation of a Gaussian process kernel.

There may be a provision for the activation functions to comprise a kink function, a sigmoid function, a hyperbolic tangent function or a linear function.

In one specific embodiment, the processor core may be designed to provide the use of local length scales for the calculation of the RBF model as a function of an RBF selection variable.

Furthermore, the processor core may be designed to perform the calculation of partial derivations of the RBF model as a function of a gradient selection variable.

According to one specific embodiment of the present invention, the processor core may be designed in a surface area of an integrated chip.

According to another aspect of the present invention, a control unit having a microprocessor and the above model calculating unit is provided. The control unit may be designed in particular as an integrated circuit.

According to another aspect of the present invention, a use of the above control unit is provided as a control unit for controlling an engine system in a motor vehicle.

BRIEF DESCRIPTION OF THE DRAWINGS

Specific embodiments are explained in greater detail below on the basis of the figures.

DETAILED DESCRIPTION OF EXAMPLE EMBODIMENTS

Figure 1:
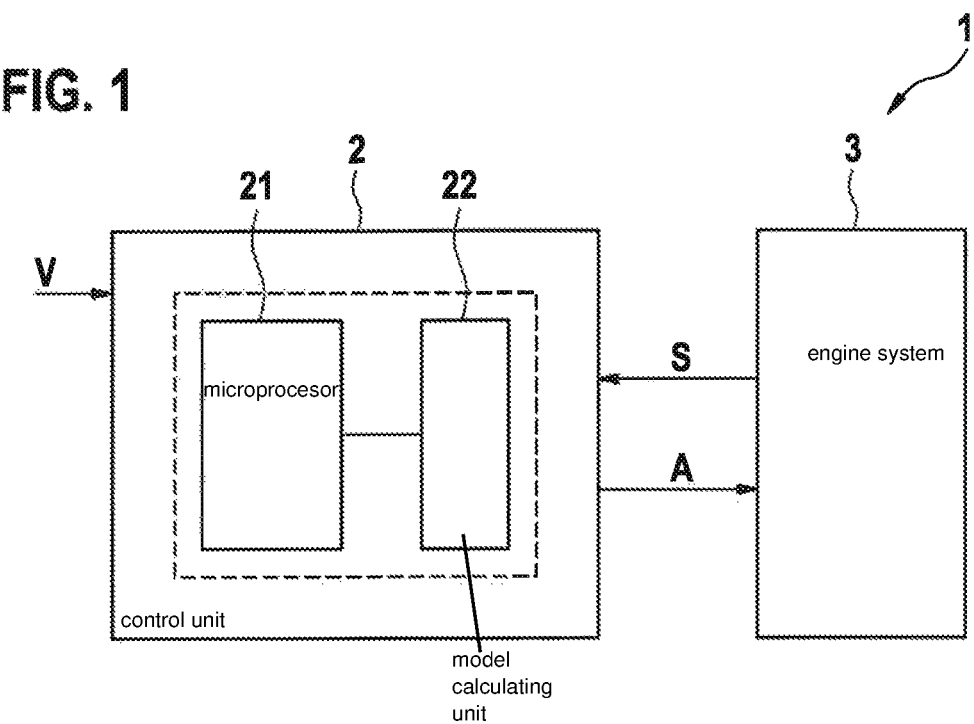
FIG. 1 shows a schematic representation of a control unit for use for an engine system in a motor vehicle.

FIG. 1 shows in exemplary fashion a schematic representation of a control unit 2 for an engine system 1 having a combustion engine 3 as a technical system to be controlled. Control unit 2 comprises a microprocessor 21 and a model calculating unit 22, which may be developed as separate components or in integrated fashion in separate surface areas on a chip. In particular, model calculating unit 22 represents a hardware circuit, which may be structurally separate from a processor core of microprocessor 21.

Model calculating unit 22 is hardwired and is accordingly not designed like microprocessor 21 to execute a software code and thereby to execute a variable function specified by software. In other words, no processor is provided in model calculating unit 22 so that the latter is not able to be operated by a software code. Focusing on a specified model function allows for a resource-optimized implementation of such a model calculating unit 22. In an integrated structural design, the model calculating unit 22 may be implemented in surface area-optimized fashion, which additionally allows for fast calculations.

Control unit 2 is essentially used to process sensor signals S or sensor variables, which are recorded by a sensor system in internal combustion engine 3, and/or external inputs V, and to apply, cyclically at definitely specified time intervals of e.g. 1-100 ms or in angular synchronous manner as a function of a crankshaft angle of an operated internal combustion engine, values of one or multiple corresponding control variables A to internal combustion engine 3 so that the latter may be operated in a conventional manner.

Figure 2:
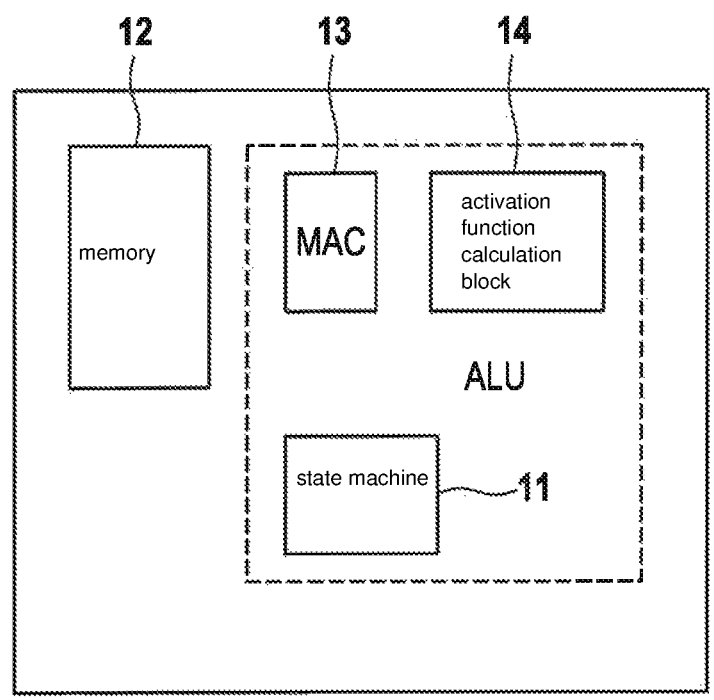
FIG. 2 shows a schematic representation of a calculating unit as part of the control unit.

FIG. 2 shows a model calculating unit 22 in more detail. Model calculating unit 22 comprises a state machine 11, a memory 12 and one or multiple operation blocks, which may include for example one or multiple MAC blocks 13 (MAC: Multiply ACumulate for fixed point or floating point calculations) and an activation function calculation block (ACT) 14 for calculating an activation function. State machine 11 and the one or the multiple operation blocks 13, 14 form a processor core ALU of model calculating unit 22. In addition or as an alternative to the MAC block, the operation blocks may comprise a multiplication block and an addition block.

With the aid of state machine 11, values of input variables stored in an input variable memory area of memory 12 may be calculated by repeated loop calculations in order to obtain intermediate variables or output variables that are written into a corresponding output variable memory area of memory 12.

State machine 11 is designed to calculate an RBF model (RBF: Radial Basis Function).

A radial basis function corresponds to a function whose value depends only on the distance from the origin so that the function according to this definition is radially symmetric and that furthermore these functions are used as basis functions of an approximation.

State machine 11 may be described according to the following pseudocode:

```
/* input transformation */
for (k=0; k<p7; k++) {
    ut[k] = u[k]*p1[k] + p2[k];
}
/* loop calculation */
for (j=p8; j<p6; j++) {
    i = j * p7;
    t = 0;
    for (k=0; k<p7; k++) {
        d = V[i+k] − ut[k];
        t += L[k] * d * d;
    }
    y[0] += p3[j]*exp(−t);
}
/* output transformation */
z[0] = y[0] * p4[0] + p5[0];
``` where
p7: maximum index value for the input variables of the input variable vector, indicates the dimension of the input variable vector
p8: minimum index value (normally zero, except in interruption and continuation of the calculation)
p6: maximum index value (number of supporting points)
p3: parameters of the RBF model
u: input variables
ut: transformed input variables
L: dimension-wise length scales
V: training points or supporting points
p1, p2: variables for the input transformation for each of the input variables of the input variable vector
p4, p5: variables for the output transformation with dimension 1 (singleton).

With the aid of the above pseudocode, it is possible to perform the following calculation for the RBF model:

$$y[0]=\Sigma_{j=0}^{p6-1}(p3[j]\cdot\exp(-\Sigma_{k=0}^{p7-1}L[k]\cdot(V[j,k]-ut[k])^2))$$

Figure 3:
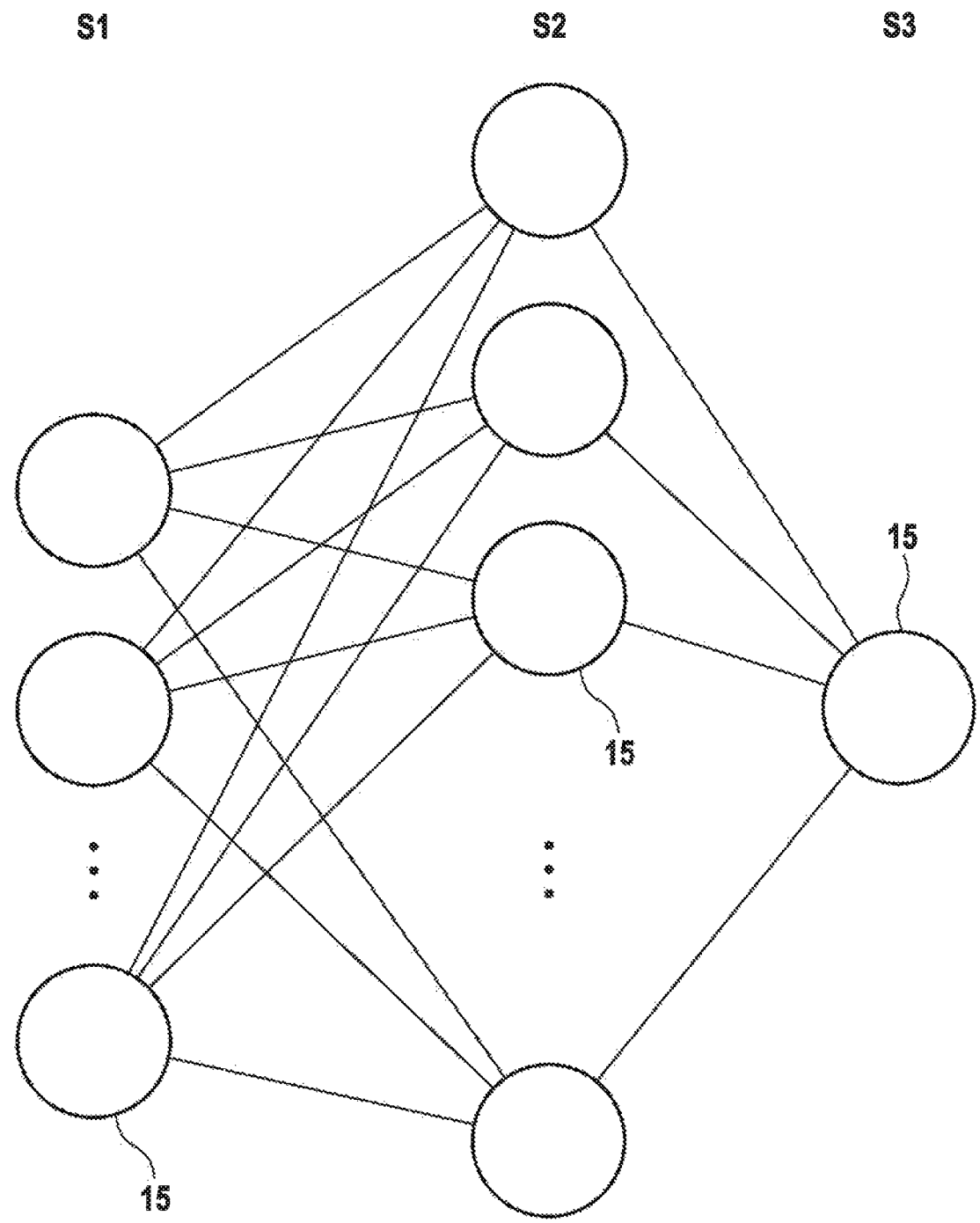
FIG. 3 shows a schematic representation of a neural constellation of an RBF model.

As shown graphically in FIG. 3, the RBF function corresponds essentially to a special form of a neural network having three layers, i.e. an input layer S1 having p7 neurons 15 for an input variable vector having p7 input variables, an intermediate layer S2 having a number of p6 neurons 15, having a radial-quadratic function as activation function, and an output layer S3 having one neuron 15 and having a linear activation function.

An input and/or output transformation of the input variables of the input variable vector and, respectively, of the output variables of the output variable vector may be performed with the aid of scaling variables p1 and p2 specified for each element of the input variable vector and, respectively for the output variable p4 and p5.

The calculation of the RBF model allows for a slim design of model calculating unit 22 so that its surface area requirement in an integrated structural design is low.

Figure 4:
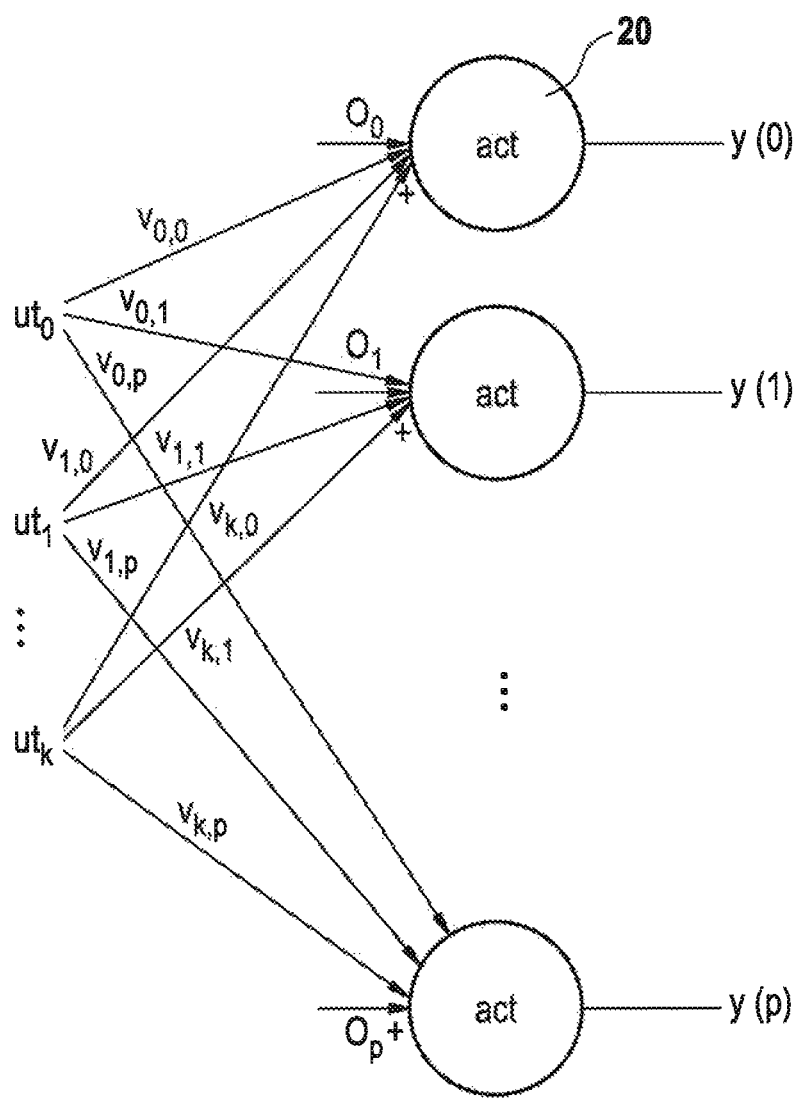
FIG. 4 shows a schematic representation of a neural layer of an MLP model.
Figure 5A:
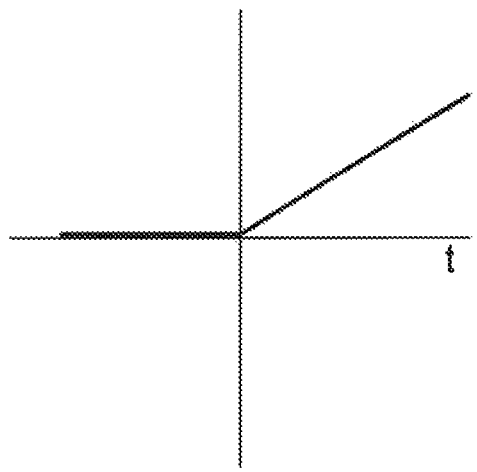
FIGS. 5a-5d show representations of possible activation functions.
Figure 5B:
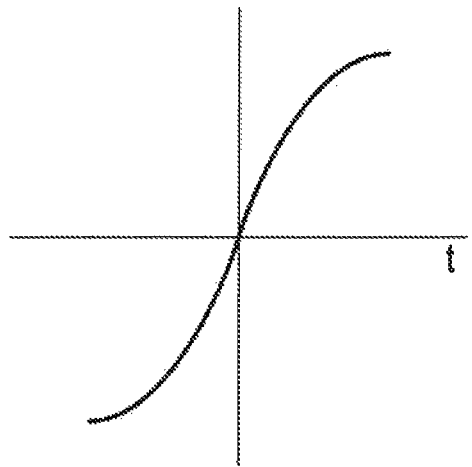
Figure 5C:
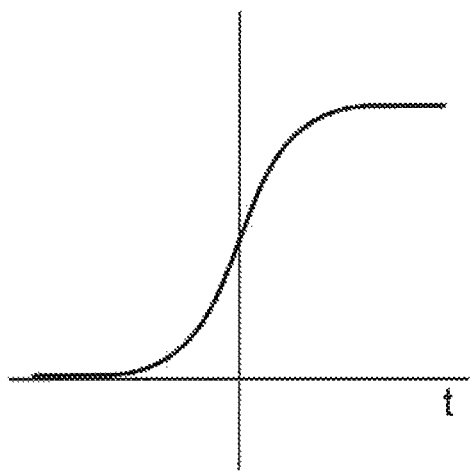
Figure 5D:
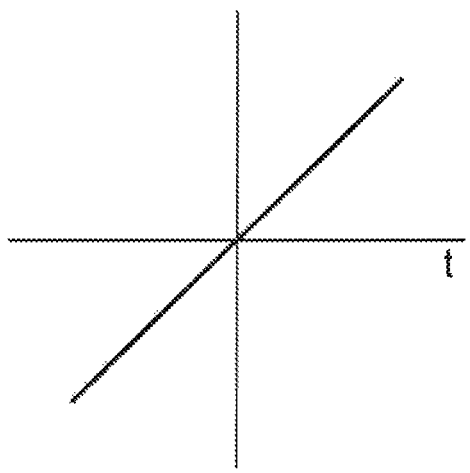

The existing hardware may also be modified as follows for the general calculation of a neural layer of a multilayer perceptron model. FIG. 4 shows a neural layer of multiple neurons 20 which are supplied with values of input variables of an input variable vector $ut_0 \ldots ut_k$ (where k=p7−1). The values of the input variables are weighted with the aid of an accordingly specified weighting matrix made up of weighting factors $v_{0\ldots p, 0\ldots k}$ (where p=p6−1). The weighting normally occurs by multiplicative application of the associated weighting factors $v_{0\ldots p7-1, 0\ldots p6-1}$. The variable p6 corresponds to the number of neurons 20 and the variable p7 corresponds to the number of input variables.

The result of the sum of the weighted values of the input variable vector $ut_0 \ldots ut_{p7-1}$ has an offset value $O_0 \ldots O_{P6-1}$ (corresponds to p3[0] . . . p3[p6−1]) applied to it, in particular applied additively. The result is transformed using a specified activation function "act". As a result, one obtains a corresponding value of an output variable vector $y_0 \ldots y_{p6-1}$. The provision of the offset value $O_0 \ldots O_{p6-1}$ for each neuron 20 provides another degree of freedom for the model formation.

$$y[j] = act(0[j] + \Sigma_{k=0}^{p7-1} v_{j,k} * ut[k]) \text{ for } j = 0 \ldots p6-1$$

Defining the controlled variables p6 makes it possible to set the number of neurons 20 of the neural layer to be calculated. By using the values of the output variable vector $y_0 \ldots y_{P6-1}$ of a neural layer as input variable vector for calculating a subsequent neural layer, a multilayer perceptron model may be used in model calculating unit 22 so that the number of neural layers of the multilayer perceptron model may be implemented by repeatedly calling the function according to the above pseudocode or by repeatedly calling the model calculating unit 22 with accordingly changed parameters.

As activation function "act," one of several activation functions may be provided in calculating the perceptron model, which may be calculated by the activation function calculation block 14 of model calculating unit 22. As activation functions act, it is possible to use for example a kink function, a hyperbolic tangent function, a sigmoid function or a linear function, as shown respectively in FIGS. 5a through 5d.

A pseudocode for state machine 11 is shown below, which alternatively calculates the RBF model or a neural layer of a perceptron model.

```
flag_clr_y = cfg_autoclear_y;
/* input transformation */
for (k=0; k<p7; k++) {
    ut[k] = u[k]*p1[k] + p2[k];
}
/* loop calculation */
for (j=p8; j<p6; j++) {
    i = j * p7;
    t = (cfg_mlp) ? p3[j] : 0.0f; // initialization for MLP calculation
    for (k=0; k<p7; k++) {
        if (cfg_mlp) {
            t += V[i+k] * ut[k];
        }
        else {
            d = V[i+k] − ut[k];
            n = (cfg_rbf_local) ? i+k : k;
            f = L[n] * d;
            t += f * d;
            // storing intermediate values for ascertaining partial derivations
            if (cfg_pd) ud[k] = f;
        }
    }
    if (cfg_mlp) {
        switch (cfg_activation_function) {
            case 1:
                e = (t>=0.0f) ? t : 0.0f; // kink function
                break;
            case 2: // sigmoid function
                e = sigmoid(t);
                break;
            case 3: // tanh function
                e = tanh(t);
                break;
            default: // linear function
                e = t;
        }
        y[j] = e;
    }
    else { // for Gaussian process model/RBF model
```

```
        e = exp(−t);
        if (flag_clr_y)
            for (n=0; n<p9; n++) y[n] = 0.0f; /* for non-MLP, p9 defines length */
        q = p3[j] * e;
        y[0] += q;
        if (cfg_pd)
            for (n=1, k=p10; n<p9; n++,k++) y[n] += q * ud[n];
        /* clear flag */
        flag_clr_y = false;
    }
}
/* output transformation */
j = (cfg_mlp) ? p6 : p9;
for (k=0; k<j; k++) {
    z[k] = y[k] * p4[k] + p5[k];
}
```

The hardware design defined by the above pseudocode makes it possible to calculate, in addition to a neural layer of a multilayer perceptron model, also a Gaussian process model or an RBF model (RBF: Radial Basis Function).

It may be seen that in the execution of the loop function it is possible to perform a case distinction using variable cfg_mlp. At cfg_mlp=1, the calculation of the neural layer is selected and using cfg_activation_function=0 . . . 3 the type of the activation functions described above may be selected. At cfg_mlp=0, a Gaussian process model or an RBF model is calculated. Here a selection of the activation function is not necessary since it may always be calculated using the exponential function. In this manner, it is possible to use model calculating unit 22 both for calculating Gaussian process models and RBF models as well as for calculating a neural layer of an MLP model and to require in the process only a small surface area in an integrated construction of the state machine.

Furthermore, depending on the selected calculation, a vector or a single value may be output as the result. Using a configuration flag cfg_autoclear_y, the processing unit is able to provide automatically for the initialization of the summing of the loop calculation to 0. This has the advantage that it is not necessary to clear or initialize the memory prior to starting the calculation. Furthermore, it is not necessary temporarily to store preliminary results during a resuming calculation. Only a different memory section is required for storing the result since y stores the pointer address.

In the above pseudocode, the initialization of the result is performed in an additional loop calculation.

```
if (flag_clr_y)
    for (n=0; n<p9; n++) y[n] = 0.0f;
``` y[0] is subsequently used as initial value for the summing of

```
q = p3[j] * e;
y[0] += q;
``` in order to obtain the result of the calculation of the Gaussian process model or of the RBF model.

The initialization is thus performed in the first pass of the loop calculation if the configuration flag cfg_autoclear_y is set. No additional loop calculation in the calculating unit is necessary for this initialization of the calculation since the accumulator may be initialized with zero via this configuration flag.

In a resumption of the loop calculation after a prior abortion, it is now possible to leave out the input scaling so as to speed up the calculation. Furthermore, the abortion of the calculation may be permitted only at the end of the calculation of the outer loop so that the result of the intermediate calculation does not have to be discarded.

Moreover, by configuration of the selection variable cfg_pd, the above pseudocode allows for the calculation of partial derivations of the Gaussian process model or the RBF model with global or local length scales according to the selected input variables.

On the whole, by configuration of selection variables such as, e.g., cfg_mlp, cfg_rbf_local, cfg_pd, the above hardware structure of model calculation unit 22 makes it possible to support the following different models.

MLP model having different activation functions;
RBF model having global length scales;
RBF model having local length scales;
Gaussian process model, whose calculation essentially corresponds to the calculation of the RBF model; and
partial derivations of the RBF model having local or global length scales or of the Gaussian process mode.

What is claimed is:

1. A control unit, comprising:
   a microprocessor; and
   one or multiple model calculating units for selectively calculating an RBF model or a neural layer of a multilayer perceptron model, each of the model calculating units including a hardwired processor core configured completely in hardware to calculate a definitely specified computing algorithm in coupled functional blocks, the processor core being configured to calculate an output variable for an RBF model as a function of: (i) one or multiple input variables of an input variable vector, (ii) supporting points, (iii) length scales, and (iv) parameters specified for each of the supporting points, the processor core furthermore being configured to calculate an output variable for each neuron of a neural layer of a multilayer perceptron model having a number of neurons as a function of: (i) the one or the multiple input variables of the input variable vector, (ii) a weighting matrix having weighting factors, and (iii) an offset value specified for each of the neurons;
   wherein each of the one or more model calculating units is hardwired, is formed completely in hardware, and is not capable of executing software code;
   wherein each processor core is configured to perform, based on a selection variable, a selection between (i) the calculation of the output variable for the RBF model, and (ii) the calculation of each output variable for each neuron of the neural layer of the multilayer perceptron model;
   wherein the control unit is configured to receive detected sensor signals from a sensor system in an internal combustion engine as the input variable vector, and to control the internal combustion engine as a function of the calculated output variable.

2. The control unit as recited in claim 1, wherein for calculating the RBF model, the output variable is formed in the processor core as a sum of a value calculated for each of the supporting points, the value being a product of a parameter associated with the respective supporting point and a result of an exponential function of a value that results from the quadratic distance, weighted by the length scale, of the respective supporting point from the input variable vector, and/or a sum of the values of the input variables weighted by a weighting factor determined by the neuron and the input variable and the offset value specified to the neuron being calculated and the result being transformed using an activation function to obtain the output variable for the neuron.

3. The control unit as recited in claim 1, wherein a common memory area is assigned to the supporting points and the weighting matrix with weighting factors.

4. The control unit as recited in claim 1, wherein a shared memory area is assigned to the parameters specified for each of the supporting points and to the offset values specified for each neuron.

5. The control unit as recited in claim 1, wherein each processor core is configured to select as a function of a further selection variable a type of activation function for the multilayer perceptron model and/or to perform a calculation of a Gaussian process kernel.

6. The control unit as recited in claim 5, wherein the activation function is a kink function, or a sigmoid function, or a hyperbolic tangent function, or a linear function.

7. The control unit as recited in claim 1, wherein each processor core is configured to use local length scales for the calculation of the RBF model as a function of an RBF selection variable.

8. The control unit as recited in claim 1, wherein each processor core is configured to perform a calculation of partial derivations of the RBF model as a function of a gradient selection variable.

9. The control unit as recited in claim 1, wherein each processor core is developed in a surface area of an integrated chip.

10. The control unit as recited in claim 1, wherein each processor core is configured to initialize the output variable as a function of a configuration variable during a loop calculation for ascertaining the sum of the result of the additions for all supporting points to a specified value.

11. The control unit as recited in claim 10, wherein each processor core is configured to initialize multiple output variables of an output variable vector as a function of a configuration variable during the loop calculation for ascertaining the sum of the results of the additions for all supporting points to a specified value.

12. The control unit as recited in claim 1, wherein each processor core includes a state machine and one or multiple calculation operation blocks, the calculation blocks including a MAC block and an exponential function calculation block, and each processor core further includes a memory to store the one or multiple input variables of the input variable vector, the supporting points, the length scales, the parameters specified for each supporting point, and of the output variable.

* * * * *